(12) United States Patent
Guest

(10) Patent No.: US 8,882,156 B2
(45) Date of Patent: Nov. 11, 2014

(54) TUBE COUPLINGS

(71) Applicant: John Guest International Limited, Middlesex (GB)

(72) Inventor: Timothy Steven Guest, Bray (GB)

(73) Assignee: John Guest International Limited, Middlesex (GB)

( * ) Notice: Subject to any disclaimer, the term of this patent is extended or adjusted under 35 U.S.C. 154(b) by 0 days.

(21) Appl. No.: 13/852,822

(22) Filed: Mar. 28, 2013

(65) Prior Publication Data

US 2013/0257043 A1   Oct. 3, 2013

(30) Foreign Application Priority Data

Mar. 29, 2012 (GB) .................................. 1205577.8

(51) Int. Cl.
*F16L 21/06* (2006.01)
*F16L 37/10* (2006.01)
*F16L 37/092* (2006.01)

(52) U.S. Cl.
CPC .......... *F16L 37/101* (2013.01); *F16L 37/0925* (2013.01)
USPC ......................................... 285/322; 285/323

(58) Field of Classification Search
USPC ......................................... 285/322, 323, 249
See application file for complete search history.

(56) References Cited

U.S. PATENT DOCUMENTS

| 4,043,576 | A | * | 8/1977 | Reich et al. | 285/322 |
| 4,627,644 | A | * | 12/1986 | Ekman | 285/323 |
| 4,637,636 | A | * | 1/1987 | Guest | 285/323 |
| 5,171,045 | A | * | 12/1992 | Pasbrig | 285/322 |
| 5,181,751 | A | * | 1/1993 | Kitamura | 285/322 |
| 5,284,369 | A | * | 2/1994 | Kitamura | 285/322 |
| 6,056,326 | A | * | 5/2000 | Guest | 285/322 |
| 6,880,865 | B2 | * | 4/2005 | Guest | 285/322 |
| 6,929,289 | B1 | * | 8/2005 | Guest | 285/322 |
| 6,957,833 | B2 | * | 10/2005 | Guest | 285/322 |
| 7,425,022 | B2 | * | 9/2008 | Guest | 285/322 |
| 7,455,328 | B2 | * | 11/2008 | Chelchowski et al. | 285/323 |
| 7,726,700 | B2 | * | 6/2010 | Norman | 285/322 |
| 7,900,971 | B2 | * | 3/2011 | Chiu | 285/323 |

FOREIGN PATENT DOCUMENTS

| EP | 427306 A2 | * | 5/1991 | F16L 19/08 |
| GB | 2200180 A | * | 7/1988 | F16L 17/06 |

\* cited by examiner

*Primary Examiner* — David E Bochna
(74) *Attorney, Agent, or Firm* — Workman Nydegger

(57) ABSTRACT

A tube coupling to receive and hold a tube (T) includes a coupling body (10) having a throughway with an annular step (24) facing an open end (12). An annular seal (25) is located in the coupling body adjacent to the annular step. An end cap (13) engages the coupling body and is axially moveable. A collett (17) in the cap has legs (20) with outer surfaces that engage with a tapered surface (23) in the end cap to urge the legs inwardly to grip the tube. The seal (25) is compressed axially in response to the forward movement of the end cap (13) to cause the tube end to be pressed into sealing engagement with the seal end. A biasing member (28) provides a biasing force to urge the legs (20) axially onto the tapered surface (23) when the cap is in the retracted position.

14 Claims, 3 Drawing Sheets

TUBE COUPLINGS

CROSS-REFERENCE TO RELATED APPLICATIONS

This application claims priority to United Kingdom Application No. 1205577.8, filed Mar. 29, 2012, which is incorporated herein by specific reference.

BACKGROUND OF THE INVENTION

1. The Field of the Invention

This invention relates to tube couplings which may be single or multiple tube couplings providing in-line, elbow or T-couplings or tube closures.

2. The Relevant Technology

More specifically, the present invention relates to a tube coupling to receive and hold a tube comprising a coupling body having a throughway open at one end to receive an end portion of tube, an annular step in the throughway facing the open end to provide an end stop for a tube, an annular seal located in the coupling body adjacent to the annular step, an end cap engaging the coupling body for axial movement between forward and retracted positions on the body, the end cap having an opening for the end portion of the tube to extend therethrough, a collet in the cap to allow insertion of the tube into the collet and having a plurality of legs with outer surfaces that engage with a tapered surface in the end cap which urges the legs inwardly to resist withdrawal of the tube, the seal being arranged to be compressed axially in response to forward movement of the end cap to cause the tube end to be pressed into sealing engagement with the seal. Such a coupling will subsequently be referred to as "of the kind described".

SUMMARY OF THE INVENTION

A coupling of the kind described is disclosed in EP 1 310 720. This design is a development of our "Speedfit" connector as disclosed in GB 1 520 742. It is designed to provide a seal against the end of the inserted tube. This eliminates the void which is otherwise present around the end of the tube and O-ring seal. Further, the seal creates a generally smooth throughbore with the tube. Such a void free construction provides no regions where fluid may congregate and the relatively smooth flow path is easier to clean.

This connector has met with some success. However, there have been some difficulties in establishing a reliable connection. The collet is freely slidable to a limited degree within the cap. As the tube is inserted into the collet, engagement between the tube and teeth on the collet causes a small amount of inward movement of the collet relative to the cap. Once the tube is inserted, the cap is moved axially in order to push the end of the tube into the seal resiliently deforming the seal to a sufficient degree to provide an adequate seal. However, if the collet has moved inwardly such that the legs of the collet have been moved away from the cap, the initial movement of the cap towards the forward position will serve only to close the gap between the collet and cap, rather than to provide the required compression of the seal. Thus, the amount of compression cannot be set precisely as the collet may be separated from the cap to a significant and variable extent.

According to the present invention, a coupling of the kind described is characterised by a member which provides a biasing force to urge the legs axially onto the tapered surface when the cap is in the retracted position.

With such an arrangement, the collet is held more reliably against the tapered surface in the cap as the tube is inserted. Maintaining the collet legs more reliably in contact with the tapered surface means that the amount of travel of the cap is directly related to the degree of compression of the seal as no movement is "wasted" in closing the gap between the collet and the cap. This allows the correct amount of compression of the seal to be achieved with greater reliability.

The member which provides the biasing force may be positioned anywhere in which it is able to provide the necessary biasing force. For example, it may be outside the cap such that it acts between an end surface of the cap and an outwardly projecting shoulder on a projecting portion of the collet. However, preferably, the member which provides the biasing force is within the cap as this protects it from damage and the ingress of dirt and debris.

There are a number of ways in which the member which provides a biasing force may be achieved in practice. It could, for example, be an annular extension of the seal towards the open end. This provides a continuous body which seals the tube at one end and, at the opposite end, provides the biasing force on the legs of the collet.

Alternatively, there may be a substantially rigid sleeve bridging the gap between the seal and the collet legs, the sleeve being dimensioned such that it compresses the seal, this compression then providing a biasing force which is transmitted via the sleeve to the collet legs.

Preferably, however, the member which provides the biasing force is in the form of a resilient sleeve which bridges the gap between the seal and the collet legs, with the compressibility of the resilient sleeve providing at least some of the biasing force on the legs. In this case, some of the biasing force may also be provided by compression of the seal.

When the member which provides a biasing force is tubular and is within the coupling body, this is beneficial in providing radial location and support for the tube.

The member which provides the biasing force may be made of a continuous compressible material, but is preferably a spring (e.g., a helically coiled spring, an undulating ring, or a ring of opposing crosses). This spring can be arranged such that, in the forward position of the cap, no further compression of the spring is possible. This eliminates any possibility of further inward movement of the collet against the spring thereby serving to lock the collet in position.

BRIEF DESCRIPTION OF THE DRAWINGS

Examples of couplings in accordance with the present invention will now be described with reference to the accompanying drawings, in which.

DETAILED DESCRIPTION OF THE PREFERRED EMBODIMENTS

Figure 1A:
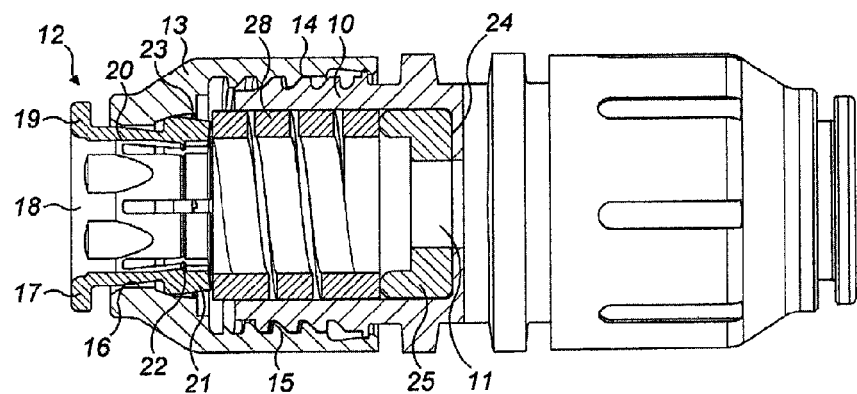
FIG. 1A is a partial axial section of a first example of a connector with the cap in its retracted position.

In all figures, the connectors illustrated are in-line connectors. For simplicity, only the left-hand side of the connector is shown in cross section. The right-hand side of the connector may have the same configuration or may be provided with a different connection mechanism as necessary. The same connector design may equally be applied to elbow or T-couplings or tube closures where again one or more of the connections is as described and others may be of different designs as necessary.

The connector comprises a coupling body 10 having a throughway 11 open at one end 12 to receive internally an end portion of the tube T and externally an end cap 13. The coupling body 10 has an external screw thread 14 which engages with a complimentary internal thread in the end cap 13. The end cap 13 has a central opening 16 in which a collet 17 is received. The collet 17 comprises an annular portion 18 extending through the opening 16 and has an outwardly projecting annular flange 19 which can be manually gripped for manipulating the collet. The portion of the collet extending into the throughway in the end cap 13 has axially extending resilient legs 20 which terminate in heads 21 having internal barbs or teeth 22 on the inner side thereof to grip the tube extending through the collet. Such collets are well known in the art.

A tapered cam surface 23 is formed within the end cap 13 and tapers inwardly towards the open end 12. The heads 21 of the collet 17 engage with the tapered cam surface 23 such that they are compressed radially inwardly as the collet is drawn axially outwardly thereby causing the barbs 22 to grip and engage the tube T extending through the collet 17. The greater the force trying to pull the tube T out of the connector, the more the collet 17 is pulled to the left in the figures and the greater the degree of compression provided to the heads 21 by the tapered cam surface 23.

The throughway 11 in the coupling body 10 is formed with a step 24 facing the open end 12 of the coupling body. An annular seal 25 is positioned in the coupling body 10 against the annular step 24.

Figure 1B:
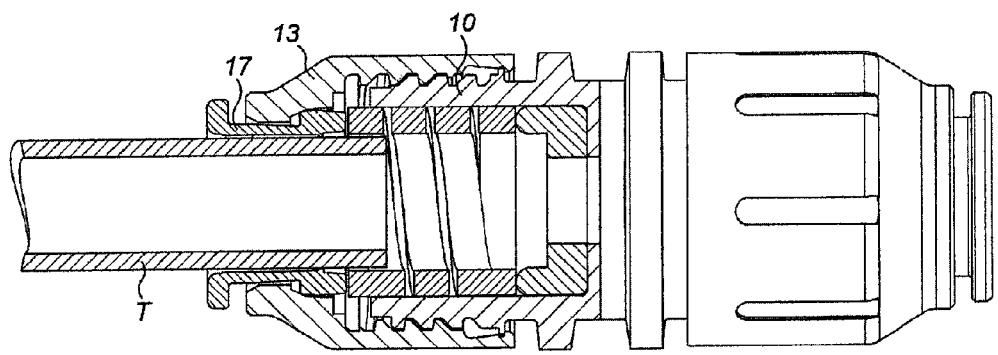
FIG. 1B is a view similar to FIG. 1A with a tube shown partially inserted.
Figure 1C:
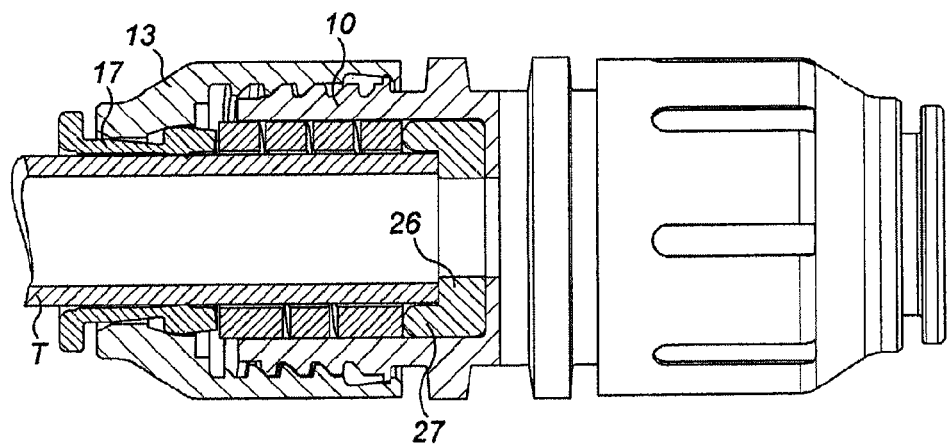
FIG. 1C is a view similar to FIG. 1B with the tube fully inserted.

As best seen in FIG. 1C, the seal 25 has an inner annular portion 26 which seals against the end face of the tube T and an outer annular portion 27 which projects towards the open end 12 to a greater degree to provide additional sealing against the tube T.

A resilient member in the form of a helical compression spring 28 is provided within the coupling body 10 so as to surround the throughway 11. One end of the spring 28 bears against the outer annular portion 27 of the seal 25 while the opposite end bears against the heads 21 of the collet 17. As the spring 28 is in compression, it provides an axial force on the collet 17 tending to urge the heads 22 towards the open end 12 such that they are held against the tapered cam surface 23.

The operation of the connector will now be described with reference to FIGS. 1A-1D. With the connector in the configuration shown in FIG. 1A, in which the cap 13 is in its retracted position, the tube T is inserted through the open end 12 as shown in FIG. 1B. The tube T will cause the legs 20 and head 21 of the collet to deflect radially outwardly and possibly also to slide axially to a small extent into the connector. However, at this time, the spring 28 ensures that the heads 21 remain in contact with the tapered cam surface 23.

The tube T is pushed into the connector until it lands on the seal 25, as shown in FIG. 1B which will cause a significant increase in the resistance to the insertion force. This demonstrates to the user that the tube T is fully inserted.

Figure 1D:
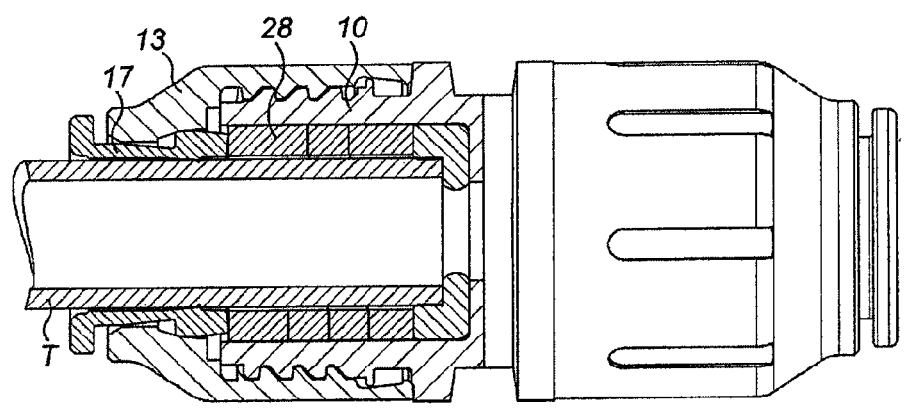
FIG. 1D is a view similar to FIG. 1C with the cap in its forward position such that the connector is fully locked.

To complete the insertion process, the end cap 13 is then rotated and the screw threads 14, 15 cause it to move into the forward position shown in FIG. 1D. The heads 21 of the collet are in engagement with the tapered cam surface 23, while the barbs 22 ensure that the heads 21 grip the tube T. Thus, substantially all of the forward movement of the end cap 13 is translated into a corresponding movement of the tube T which equates to a corresponding compression of the seal 25. Thus, the degree of compression of the seal 25 can be precisely determined with this construction. Also, as shown in FIG. 1D, as an optional feature, the adjacent coils of the spring 28 are arranged to abut one another in the forward position. This ensures that no further compression of the spring 28 is possible in the forward position thereby locking the collet in place.

In order to release the tube, the end cap 13 is unscrewed to the position shown in FIG. 1B such that, as the tube T is pulled out of the connector, the heads 21 of the collet 17 are able to deflect outwardly to a sufficient extent to allow the tube T to be completely withdrawn.

Figure 2:
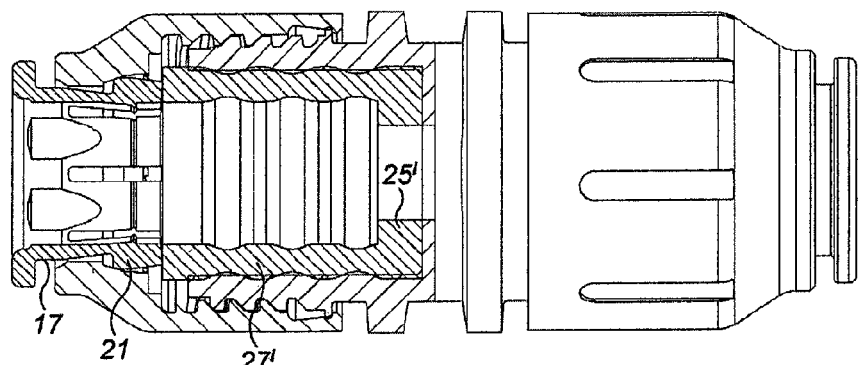
FIG. 2 is a view similar to FIG. 1A showing a second example of a connector.

A second example of a connector is shown in FIG. 2. This operates generally along the same principles as the connector previously described and only the differences are described. Essentially, the helical spring 28 has been replaced by an extension to the outer annular portion 27' of the seal 25' which bears directly against the heads 21 of collet 17. The seal 25' and extension 27' are of a resilient material such as rubber, such that it is able to provide the resilient biasing provided by the spring 28 in the first example.

Figure 3:
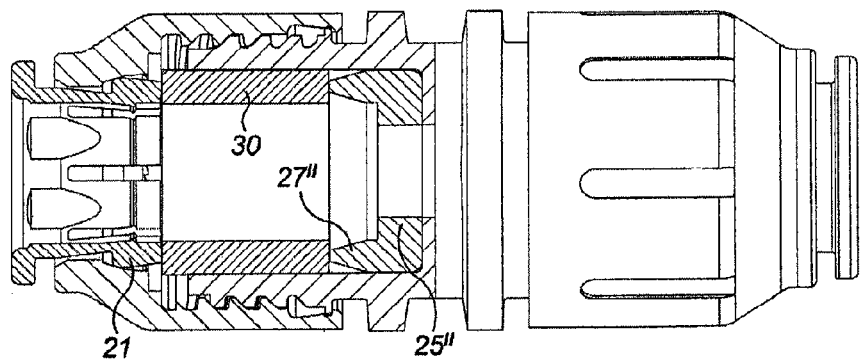
FIG. 3 is a view similar to FIG. 1A showing a third example of the connector.

In the example of FIG. 3, again, most of the features are as previously described. In this case, the spring 28 is replaced by a rigid tube 30. The outer portion of the seal 27" has been extended as compared with the outer annular portion of the seal 25 in the first example and has a more tapered configuration. In this case, the resilient biasing force on the heads 21 is provided by the resilience of the outer annular portion 27" and the tube 30 serves to transmit this force to the heads 21. The tapered configuration ensures that, even when the seal is compressed, the seal does not rub on the body or the tube and impede tube insertion.

Figure 4:
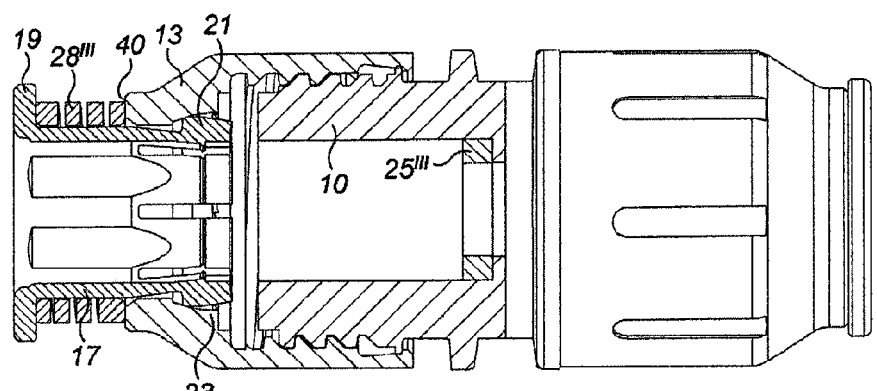
FIG. 4 is a view similar to FIG. 1A showing a fourth example of a connector.

The fourth example shown in FIG. 4 again operates on the same principle, but this time further modifications are required. In this case, the helical spring 28''' is no longer within the end cap 13, but is now between the shoulder 19 on the collet and an end face 40 of the end cap 13. In this position, it forces the end cap 13 and collet 17 away from one another, which pushes the collet such that the heads 21 are urged against the tapered cam surface 23 as before. As the resilient member is no longer inside the end cap 13, the thickness of the wall of the body 10 has been increased so as to reduce the size of the throughbore and provide support for the tube T. The seal 25 has also been simplified as shown as it has greater support at its radially outermost edge.

What is claimed is:

1. A tube coupling to receive and hold a tube, the coupling comprising:
   a coupling body having a throughway open at one end to receive an end portion of tube;
   an annular step in the throughway facing the open end to provide an end stop for a tube;
   an annular seal located in the coupling body adjacent to the annular step,
   an end cap engaging the coupling body for axial movement between forward and retracted positions on the body;
   the end cap having an opening for the end portion of the tube to extend therethrough;
   a collet in the cap to allow insertion of the tube into the collet and having a plurality of legs with outer surfaces that engage with a tapered surface in the end cap which urges the legs inwardly to resist withdrawal of the tube;
   the seal being arranged to be compressed axially in response to forward movement of the end cap which causes a terminal end face of the tube when received within the coupling body to be pressed into sealing engagement with the seal; and a biasing member which provides a biasing force to urge the legs of the collet axially onto the tapered surface of the end cap when the cap is in the retracted position, wherein the tube can be received within the end cap, collet and biasing member when the end cap is in the retracted position and the plurality of legs of the collet securely engage the tube when the end cap is in the forward position.

2. A tube coupling according to claim 1, wherein the biasing member is within the cap.

3. A tube coupling according to claim 2, wherein the biasing member is in the form of a resilient sleeve which bridges the gap between the seal and the collet legs, with the compressibility of the resilient sleeve providing at least some of the biasing force on the legs.

4. A tube coupling according to claim 2, wherein the biasing member is an annular extension of the seal towards the open end.

5. A tube coupling according to claim 2, wherein the biasing member is provided by a substantially rigid sleeve bridging the gap between the seal and the collet legs, the sleeve being dimensioned such that it compresses the seal, this compression providing the biasing force which is transmitted via the sleeve to the collet legs.

6. A tube coupling according to claim 2, wherein the member which provides the biasing force is a spring.

7. A tube coupling according to claim 1, wherein the biasing member is in the form of a resilient sleeve which bridges the gap between the seal and the collet legs, with the compressibility of the resilient sleeve providing at least some of the biasing force on the legs.

8. A tube coupling according to claim 7, wherein the member which provides the biasing force is a spring.

9. A tube coupling according to claim 1, wherein the biasing member is an annular extension of the seal towards the open end.

10. A tube coupling according to claim 1, wherein the biasing member is provided by a substantially rigid sleeve bridging the gap between the seal and the collet legs, the sleeve being dimensioned such that it compresses the seal, this compression providing the biasing force which is transmitted via the sleeve to the collet legs.

11. A tube coupling according to claim 10, wherein the portion of the seal facing the sleeve tapers inwardly towards the sleeve.

12. A tube coupling according to claim 1, wherein the member which provides the biasing force is a spring.

13. A tube coupling according to claim 12, wherein the spring is arranged such that, in the forward position of the cap, no further compression of the spring is possible.

14. A tube coupling to receive and hold a tube, the coupling comprising:

a coupling body having a throughway open at one end, an annular step in the throughway facing the open end;

an annular seal located in the coupling body adjacent to the annular step;

an end cap engaging the coupling body, the end cap having an opening extending therethrough and having a tapered surface;

a collet at least partially disposed in the end cap, the collet having a plurality of legs with outer surfaces that engage with the tapered surface of the end cap which urges the legs inwardly, wherein the end cap is movable between a retracted position wherein a tube terminating at a terminal end face can be passed through the collet and the opening of the end cap so that the terminal end face of the tube is disposed adjacent to the seal and a forward position wherein the plurality of legs securely engage the tube within the collet and the seal is axially compressed between the terminal end face of the tube and the annular step; and a biasing member which provides a biasing force to urge the legs of the collet axially onto the tapered surface of the end cap when the cap is in the retracted position.

* * * * *